( 12 ) United States Patent
De Bont et al.

(10) Patent No.: US 11,999,837 B2
(45) Date of Patent: Jun. 4, 2024

(54) MODIFIED POROUS POLYOLEFIN FILM AND METHOD OF MAKING

(71) Applicant: DSM IP Assets B.V., TE Heerlen (NL)

(72) Inventors: Nicolaes Hubertus Maria De Bont, Echt (NL); Mandy Maria Jozefina Wiermans, Echt (NL); Marc Linssen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 860 days.

(21) Appl. No.: 17/045,061

(22) PCT Filed: Apr. 8, 2019

(86) PCT No.: PCT/EP2019/058846
§ 371 (c)(1),
(2) Date: Oct. 2, 2020

(87) PCT Pub. No.: WO2019/197353
PCT Pub. Date: Oct. 17, 2019

(65) Prior Publication Data
US 2021/0163706 A1 Jun. 3, 2021

(30) Foreign Application Priority Data
Apr. 13, 2018 (EP) ..................................... 18167354

(51) Int. Cl.
*C08J 9/42* (2006.01)
*C08J 5/18* (2006.01)
(Continued)

(52) U.S. Cl.
CPC . *C08J 9/42* (2013.01); *C08J 5/18* (2013.01); *C08L 23/06* (2013.01); *C08L 75/08* (2013.01);
(Continued)

(58) Field of Classification Search
None
See application file for complete search history.

(56) References Cited

U.S. PATENT DOCUMENTS 4,472,328 A  9/1984 Sugimoto
4,739,013 A  4/1988 Pinchuk
(Continued)

FOREIGN PATENT DOCUMENTS

EP   0269151 A1   6/1988
EP   0378279 A1   7/1990
(Continued)

OTHER PUBLICATIONS

International Search Report and Written Opinion dated Jul. 2, 2019.

*Primary Examiner* — Chinessa T. Golden
(74) *Attorney, Agent, or Firm* — Kevin M. Bull (57) ABSTRACT

Disclosed herein is a porous hybrid elastomer/polyolefin film, which is a porous polyolefin film wherein at one or more isolated areas of the film pores are at least partly filled with an elastomer. This hybrid film shows improved resistance to tearing, whereas other properties like porosity, polarity, thickness, flexibility, and non-stickiness of the film are substantially retained. Other advantages include improved suture retention. The invention also provides a method to increase tear resistance of a porous polyolefin film comprising steps of providing a porous polyolefin film; identifying one or more locations on the film, at which locations tearing is likely to occur during intended use of the film; applying at the identified locations of the film an amount of a solution of an elastomer in solvent; and substantially removing the solvent; to result in a hybrid elastomer/polyolefin film having one or more isolated areas where pores in the film are at least partly filled with the elastomer. Further aspects concern uses of these hybrid films as a component of a medical implant or device, especially (Continued)

for use in contact with body tissue or fluids, such as in vascular applications like a vascular graft, a stent cover or a catheter balloon; and medical devices or implants comprising said porous hybrid films.

23 Claims, 3 Drawing Sheets (51) Int. Cl.
*C08L 23/06* (2006.01)
*C08L 75/08* (2006.01)

(52) U.S. Cl.
CPC ........ *C08J 2207/10* (2013.01); *C08J 2323/06* (2013.01); *C08J 2475/08* (2013.01); *C08L 2203/02* (2013.01); *C08L 2207/04* (2013.01); *C08L 2207/068* (2013.01)

(56) References Cited

U.S. PATENT DOCUMENTS

| | | |
|---|---|---|
| 4,810,749 A | 3/1989 | Pinchuk |
| 5,133,742 A | 7/1992 | Pinchuk |
| 5,229,431 A | 7/1993 | Pinchuk |
| 5,797,932 A | 8/1998 | Min |
| 6,544,167 B2 | 4/2003 | Buckberg |
| 6,602,224 B1 | 8/2003 | Simhambhatla |
| 6,652,966 B1* | 11/2003 | Hin .................. C08L 23/06 |
| | | 428/297.4 |
| 7,671,162 B2 | 3/2010 | Ward |
| 2002/0054969 A1 | 5/2002 | Clarke |
| 2002/0187288 A1 | 12/2002 | Lim et al. |
| 2012/0130483 A1* | 5/2012 | Goldmann .......... A61L 27/34 |
| | | 623/1.46 |
| 2013/0325117 A1 | 12/2013 | Bruchman et al. |
| 2014/0352875 A1 | 12/2014 | Laguna |

FOREIGN PATENT DOCUMENTS

| | | |
|---|---|---|
| EP | 0504954 A1 | 2/1992 |
| EP | 3058878 B1 | 7/2019 |
| JP | 58149925 A | 9/1983 |
| JP | 2019517713 A | 6/2019 |
| WO | 9733533 A1 | 9/1997 |
| WO | 2009063067 A2 | 5/2009 |
| WO | 2017210405 A1 | 12/2017 |

* cited by examiner

MODIFIED POROUS POLYOLEFIN FILM AND METHOD OF MAKING

CROSS-REFERENCE TO RELATED APPLICATIONS

This application is a U.S. national phase entry under 35 USC 371 of international application PCT/EP2019/058846, filed 8 Apr. 2019, which designated the U.S. and claims priority to European Application 18167354.2, filed 13 Apr. 2018, the entire contents of each of which is hereby incorporated by reference in its entirety.

FIELD

The disclosed invention pertains to modified porous polyolefin films suitable for biomedical use, to methods of making such films, to methods of increasing tear resistance of porous polyolefin films, and to medical devices comprising such modified films.

Background

Porous polyolefin sheets or films, like biaxially-oriented microporous films based on polyethylene or polypropylene, especially such films based on ultra-high molar mass polyethylene (UHMWPE), may be used in several different applications; including use as filtration membranes, as separator films for batteries like rechargeable lithium ion batteries, and in biomedical applications like use as a component in medical devices. Polyolefin membranes with different porosity and pore sizes may be made to control permeability of certain gasses and fluids.

Such porous polyolefin films show a combination of properties, like permeability, mechanical strength and flexibility, biocompatibility, and biostability, which properties make these films also suitable components for use in medical applications in contact with body tissue or fluids, such as in vascular applications like a vascular graft, a stent cover or a catheter balloon; as described in e.g. U.S. Pat. No. 6,602,224.

In many of such uses the porous film component needs to be secured in place or to another component via some attachment means, like with metal clamps or by applying stitches (or suturing) in case of for example biomedical or surgical applications. Such attachment means may seriously affect properties like mechanical strength of a polymer film; clamps or holes resulting from stitching with a suture may for example act as stress concentrators and/or introduce small defects and may promote or induce tearing of the film and premature failure under mechanical load during use.

To overcome such disadvantageous tearing of porous films during use, which in case of medical applications might be life-threatening, various solutions to improve tear resistance have been proposed in prior art publications. For example, use of auxiliary components or sandwich constructions in suturing through sheet materials or patches is described in U.S. Pat. Nos. 5,797,932 and 6,544,167. In WO1997/033533 a porous polytetrafluoroethylene (PTFE) vascular graft is described, which is reinforced by wrapping with PTFE yarn in order to increase suture retention strength and tear resistance. Disadvantages of using such auxiliary components may include deterioration of other properties, like flexibility or porosity. EP3058878 discloses a method of increasing tear strength of porous polymer films that may be used as a surgical mesh, by including load distribution elements in the polymer film at a location near the foci of the applied load. Said load distribution elements may be for example slits, perforations, or other apertures; which serve to redistribute applied stress and increase the load required for stress propagation; but which elements may also negatively affect performance.

Despite the disclosures in these documents, there still is a need for a thin porous polyolefin film that shows improved tear resistance, especially for such improved film that combines improved tear resistance with porosity and flexibility, and which film is suitable for use as a component of a medical device.

SUMMARY

Objects of the present disclosure include providing such a modified porous polyolefin film showing improved resistance to tearing and providing a method of increasing tear resistance of a porous polyolefin film, while preventing deterioration of other properties of the film.

The aspects and embodiments as described herein below and as characterized in the claims provide modified porous polyolefin films showing improved resistance to tearing and a method of making said films.

In accordance with an aspect, the invention provides a modified porous polyolefin film according to claim 1, or a porous hybrid elastomer/polyolefin film, which is a porous polyolefin film wherein at one or more isolated areas, which areas form 0.02-40 area % of the surface area of the film, pores in the polyolefin film are at least partly filled with an elastomer.

This porous hybrid film of the invention was surprisingly found to show improved resistance to tearing, for example during intended use of the hybrid film as a component of a medical device, whereas other properties like porosity, polarity, thickness, flexibility, and non-stickiness of the film at ambient conditions are at least partly or even substantially retained. Another advantage is improved suture retention of such modified film; a porous film of which pores at selected isolated areas are filled with elastomer and which is sutured at the modified areas is found to show better resistance to tearing or other failure than both a corresponding non-modified porous film and a film made from the elastomer that is locally present in the film.

A further advantage of this porous polyolefin film locally filled or impregnated with elastomer is, that the elastomer may also function as an adhesive during further use of the film. For example, the modified film may be formed or laminated into a tubular structure by winding on a mandrel two or more layers that at least partly overlap, and then connecting the layers at an overlapping part using a heat bonding process such as described in US2014/0352875. Similarly, a tubular structure of one or more film layers that at least partly overlap may be formed by heat or solvent bonding to itself and be attached to a stent with which the film is in contact, forming a covered stent. The elastomer present in the film may thus also function as a heat- or solvent-activated adhesive, thus reducing the need for attachment means like clamps or sutures.

In accordance with another aspect, the invention provides a method to increase tear resistance of a porous polyolefin film comprising steps of
 a. Providing a porous polyolefin film;
 b. Identifying one or more locations on the film, at which locations tearing is likely to occur during intended use of the film;

c. Applying at the identified locations of the film an amount of a solution of an elastomer in solvent; and
d. Substantially removing the solvent;

to result in a hybrid elastomer/polyolefin film having one or more isolated areas forming 0.02-40 area % of the surface of the film, in which isolated areas pores in the film are at least partly filled with the elastomer.

Further aspects concern the use of these hybrid films as a component of a medical implant or device, especially use as a component that will be in contact with body tissue or fluid, such as in vascular applications like a vascular graft, a stent cover or a catheter balloon. Other aspects include medical devices or implants, for temporary or permanent use in a body, comprising said microporous hybrid films.

It will be understood that although the description is generally relating to and illustrated with microporous UHMWPE films and thermoplastic polyurethanes as elastomer, these disclosures will similarly apply to other elastomers and porous polyolefin films that are sensitive to tearing.

DETAILED DESCRIPTION

Within the context of present description, a porous film is generally understood to be a thin flexible sheet or strip of material, having length and width dimensions much larger than its thickness, and having a porosity of at least 25 vol %. A microporous film is herein understood to be a porous film having a multitude of pores with maximum pore size of about 50 μm.

A biocompatible material is biologically compatible by not producing a toxic, injurious, or immunologic response when in contact with living tissue. Biodegradable means a material is susceptible to chemical degradation or decomposition into simpler components by biological means, such as by an enzymatic action. Biostable or bioinert means the material is substantially non-biodegradable under conditions and time of intended use.

In accordance with an aspect, the invention provides a porous hybrid elastomer/polyolefin film, which comprises or is a porous polyolefin film wherein at one or more isolated areas, which constitute 0.02-40 area % of the surface of the film, pores in the polyolefin film are at least partly filled with an elastomer.

A composite or hybrid material for use as leaflets in a prosthetic heart valve is described in US2013/0325117, which material comprises a microporous polymer membrane and an elastomer that fills substantially all of the pores. The microporous membrane may be a fibrous non-woven made from a fluoropolymer, like expanded polytetrafluoroethylene (ePTFE), or from a polyethylene; and the elastomer can be a copolymer of tetrafluoro ethylene and perfluoromethyl vinyl ether or a silicone. Such composite material is stated to show less stiffening in use and better fatigue performance than non-modified membrane. US2013/0325117, however, teaches to fill substantially all pores of the membrane with elastomer; but does not disclose or suggest to only locally modify the membrane with elastomer for improving properties like tear resistance.

In embodiments of present invention, the porous hybrid elastomer/polyolefin film is based on a porous polyolefin film, which film has been modified at some selected areas of the film such that pores at said areas are at least partly filled with an elastomer; whereas porosity outside these areas remained substantially unchanged. Porous polyolefin films as such are known in the art and can be based on (i.e. made from) different types of polyolefins, and can be made using different methods, depending for example on desired properties like porosity and pore sizes.

In embodiments, the porous polyolefin film has been made from a polyolefin that can be one or more polymers selected from homopolymers and copolymers containing one or more olefins as monomer units, including e.g. bipolymers, terpolymers, etc. and which polyolefin may have been formed by any method known to those skilled in the art. Suitable examples of polyolefins include polypropylenes, polyethylenes, and their copolymers or blends; like medium density polyethylene, linear or high density polyethylene, copolymers of ethylene and one or more alpha-olefins such as butene-1, hexene-1, and octene-1, linear low density polyethylene, very low density polyethylene, ultra-low density polyethylene, ethylene/propylene copolymers, propylene homopolymer, propylene/ethylene copolymers, polyisoprene, polybutylene, polybutene, poly-3-methylbutene-1, poly-4-methylpentene-1, ionomers and the like. In embodiments, the polyolefin is a polyethylene or polypropylene homopolymer. In preferred embodiments, the polyolefin is a linear polyethylene, preferably of high molar mass such as a high molecular weight polyethylene (HMWPE) or an ultra-high molecular weight polyethylene (UHMWPE). The term molecular weight is still commonly used interchangeably with molar mass; also reflected in the commonly used abbreviation for ultra-high molar mass polyethylene (UHMWPE).

UHMWPE is a synthetic polymer that shows good biocompatibility in combination with high biostability or bioinertness, and which is used in various biomedical devices for quite some time already. UHMWPE is herein understood to be a polyethylene having an intrinsic viscosity (IV) of at least 4 dL/g, like between 4 and 40 dL/g. Intrinsic viscosity is a measure for molar mass that can more easily be determined than actual molar mass parameters like Mn and Mw. IV is determined according to method ASTM D1601 (2004) at 135° C. on solution in decalin, the dissolution time being 16 hours, with butylhydroxytoluene as anti-oxidant in an amount of 2 g/L solution, by extrapolating the viscosity as measured at different concentrations to zero concentration. There are various empirical relations between IV and Mw, such relations typically being dependent on factors like molar mass distribution. Based on the equation Mw=$5.37*10^4*[IV]^{1.37}$ an IV of 8 dL/g would correspond to Mw of about 930 kDa, see EP0504954A1. Preferably, the IV of the UHMWPE in the polyolefin film is at least 5, 6, 7 or 8 dL/g. Preferably, the IV is at most 30, 25, 20, 18, 16 or even at most 14 dL/g, to arrive at a balance between high mechanical properties and ease of processing. In general, the IV as measured on the UHMWPE polymer in the film can be somewhat lower than the IV of the polymer as used in making the film. During a film manufacturing process, like the gel-extrusion method described further on, the polyolefin may be subject to thermal, mechanical and/or chemical degradation, which may result in chain breakage, lowering of the molar mass and/or different molar mass distribution.

In further embodiments of the invention, the UHMWPE in the film may be a linear or branched polymer, linear polyethylene being preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. The linear polyethylene may further contain up to 5 mol % of one or more other alkenes that are (co-)polymerizable with ethylene, e.g. $C_3$-$C_{12}$ or $C_3$-$C_8$ alkenes; like propene, 1-butene, 1-pentene, 4-methylpentene, 1-hexene and/or 1-octene. Side chains and comonomers in UHMWPE may suitably be measured by FTIR; for example on a 2 mm thick compression molded film by quantifying the absorption at 1375 cm using a calibration curve based on NMR measurements (as in e.g. EP0269151).

The UHMWPE in the film may be a single polymer grade, but also a mixture of polyethylene grades that differ in e.g. molar mass (distribution), and/or type and amount of side chains or comonomer(s). The UHMWPE in the film may also be a blend with up to 25 mass % of another polyolefin as described above.

In further embodiments, the porous polyolefin film, like a microporous film, has an original porosity that can vary widely, for example from 25 to 95 vol %. Relatively low porosity results in a film that may show higher stiffness and strength than a film with high porosity, which may be very flexible, pliable and smooth. It will therefore depend on the targeted application of the porous film which porosity level is desired. For example, for industrial uses like a battery separation film, generally microporous films having a porosity of 30-50 vol % and typical pore size in the range of 0.03-0.1 µm are applied. For medical applications such as vascular prostheses or devices, high flexibility and kink resistance resulting from thin films with high porosity, like at least 50 vol %, is preferred in combination with pores of about 0.05 or 0.1 µm and larger. Such pores would reduce the risk of thrombus formation in contact with blood, like when the film is used as a graft material.

In embodiments of the invention, the porous hybrid film is based on a porous polyolefin film, which has a porosity of 50-95 vol %, preferably of at least 60, 70 or 80 vol % and of at most 92, 90 or 88 vol %. The pore size of the pores in the polyolefin film is preferably 0.05-10 µm, or at least 0.1 or 0.5 µm and at most 8 or 5 µm. Starting from such microporous film makes the resulting hybrid elastomer/polyolefin film suitable for use as a component of a medical device, e.g. for vascular applications.

Porosity of a film can be determined by measuring density of the film and relating it to the density of the material (e.g. polyolefin) from which the film is made. Pore sizes can be determined using a capillary flow porometer. Such method is based on the displacement of a wetting liquid from the pores in the sample by applying a gas at increasing pressure. It is widely used to measure minimum, maximum (or first bubble point), and mean pore sizes, as well as pore size distribution. Alternatively, microscopic techniques may be used to determine pore size.

The porous polyolefin films as described above, like microporous UHMWPE films, can have been made by different processes as known to a person skilled in the art. In general, polyolefins can be melt processed using extrusion equipment and suitable slit dies into a base film, which film is stretched (also called drawn) in one or two directions, sequentially or simultaneously, to improve mechanical properties by orienting polymer chains. This process may also induce porosity as a result of the stretching and molecular orientation inducing e.g. crystallization; preferably in two directions (bi-axial stretching or orienting; typically in machine direction and transverse direction). In general, porosity of a polymeric article can result from or can be improved by adding a pore forming agent to a polymer composition. Pore forming agents can be compounds that release gas during processing or be compounds (including solvents) that are removed from the film as made from a composition comprising polymer and pore forming agent afterwards, for example by evaporation or extraction steps. Examples of the latter pore forming agents can be plasticizing compounds or solvents that are added to a polyolefin composition. Solvents for polyolefin are also advantageously used in case of polyolefins having such high molar mass that melt processing is severely hampered or even not feasible, for example in case of UHMWPE. For making UHMWPE into articles like fibers or films, solution processing techniques have been developed; such as a so-called gel-extrusion or geltrusion process. In such process a solution of polyolefin is processed into film or fiber form as a solution, which solution solidifies into a gel upon cooling, the solvent-containing gel having such properties that it can be further processed and stretched forming extended polymer crystals. The solvent can be removed during or after such steps by extraction and/or evaporation. Methods of making polyolefins into microporous films, including geltrusion, are described in for example U.S. Pat. No. 4,472,328, EP0378279, EP0504954, JP58149925, and US2002/0054969. More specifically, in EP0378279 a process for making microporous UHMWPE films is described comprising steps of making a homogeneous solution of 2-30 mass % of UHMWPE in evaporable solvent; forming into a gel film; removing solvent by evaporation below the dissolution temperature of UHMWPE in the solvent, while preventing shrinkage or stretching the film in at least one direction; optionally stretching the film in one or two directions after solvent removal at a temperature below the melting point of UHMWPE. In embodiments, the porous polyolefin film is not a textile structure or fabric; like woven, knitted or non-woven fabrics, which are made from polyolefin fibers.

Figure 1A:
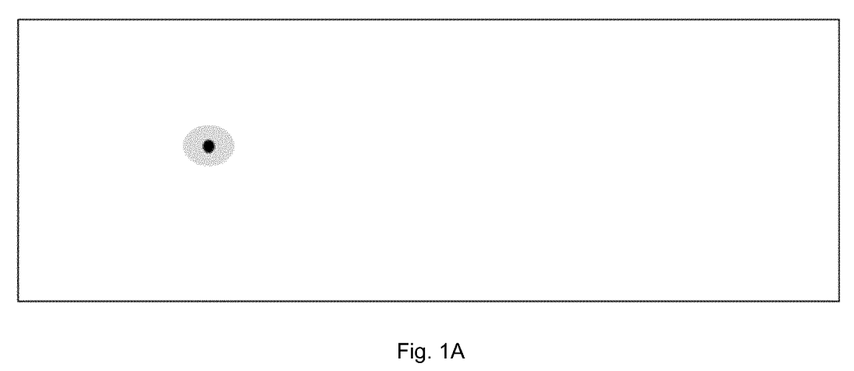
FIGS. 1A-1C show some simplified representations of 'spots' and 'stripes' as examples of isolated areas where a porous film can be modified with elastomer.
Figure 1B:
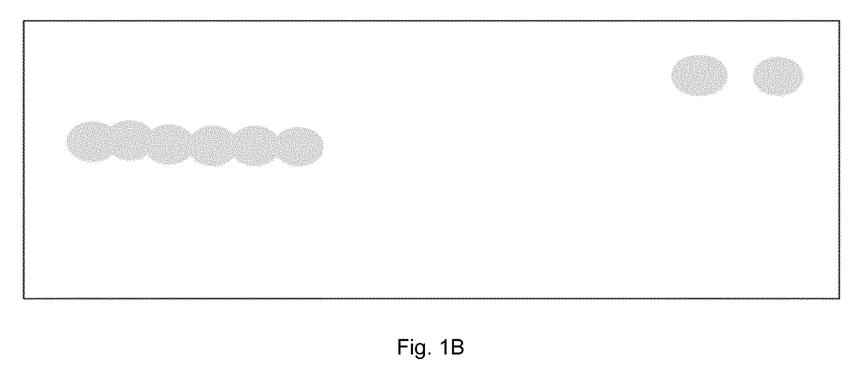
Figure 1C:
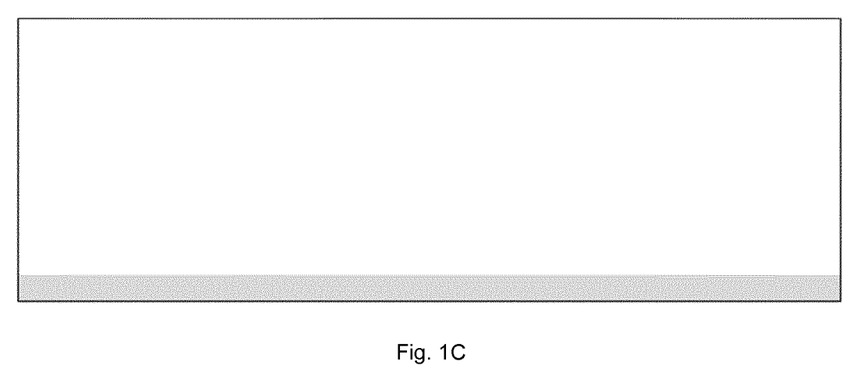

Generally, the porous polyolefin film has a thickness in the micrometer range, such as a thickness of 0.5-50 µm, or at most 1, 2 or 3 µm and at most 40, 30, 20, 15 or 10 µm; depending on its intended use. In embodiments, the hybrid elastomer/polyolefin film has a thickness in similar ranges, such as a thickness of 0.5-50 µm, or at most 1, 2 or 3 µm and at most 40, 30, 20, 15 or 10 µm; considering that only locally part of the pores are at least partly filled with elastomer, which may have only small and mainly local effect on film thickness and will hardly affect average thickness of the film. In the porous hybrid elastomer/polyolefin film, pores are at least partly filled with an elastomer at one or more isolated areas of the film. The film is called a porous hybrid film, because a base porous polyolefin film has been modified with another polymer, that is with an elastomer distinct from the polyolefin. The elastomer is not present in the hybrid film as a blend with polyolefin, but is locally present within part of the pores of the polyolefin film that also still contains non-filled pores. Within the present description isolated areas are considered to be relatively small island-like domains, for example the isolated area can be a 'spot' or a 'stripe'. A spot or stripe is an area on the surface of the film, at which the pores in the film are at least partly filled with elastomer; that is the pores in a volume segment of the film from the surface at one side to the surface at the opposite side of the film. A spot can be a substantially circular area on the surface, thus also representing a substantially cylindrical segment of the film, with a diameter of at most about 5 mm, or an oblong, oval or other non-circular isolated area on the film (when looked at a surface of the film) and with an average cross dimension or width of at most 5 mm; that is having a surface area of at most that of a circle with 5 mm diameter. A stripe is an elongated area (or segment) with a width of at most 5 mm and a length of up to the largest dimension of the film; which may for example have been formed from an array of adjacently—or partly overlapping—applied droplets (spots) of an elastomer solution. A stripe can also have been made by applying liquid while applicator and film are moving relative to each other. A stripe can also be the result, especially a stripe at an edge zone of the film, of a dip-coating process wherein the film is only submerged in elastomer solution at one or more of its edges. Preferably, the isolated areas have a diameter or width of at most 4, 3, 2 or 1.0 mm, or an equivalent thereof. Minimum diameter or width of an isolated area may be as small as 0.1 mm, preferably diameter or width is at least 0.2, 0.3, 0.4 or 0.5 mm. These areas are local and isolated, meaning they are separated from each other at one or more different places of the film, without being connected to each other via elastomer. In FIG. 1 some schematic drawings are shown that represent rectangular pieces of porous film locally modified with elastomer, to illustrate the above. In FIG. 1A elastomer has been applied for example as a droplet of an elastomer solution, resulting in a substantially circular spot (grey), where elastomer is present in pores and wherein a small hole can be made afterwards using e.g. a needle or by laser cutting (indicated as a black dot; through which hole an object may pass in use). FIG. 1B shows two isolated spots, and an isolated stripe; for example applied as droplets of elastomer solution. The piece of film represented in FIG. 10 has a stripe along one of its edges as an isolated area, which may typically have resulted from a dip-coating step.

The pores in such isolated areas of the film are at least partly filled with elastomer, which includes the pores in a volume segment of the film across its thickness defined by the isolated area on a surface of the film. These pores are at least partly filled with elastomer, for example at least 20 or 30 vol % of the pore volume concerned is taken up by the elastomer. In further embodiments of the invention, at least 40, 50, 60, 70, 80 or 90 vol % of said pores is filled with elastomer, or the pores within such isolated area are substantially completely filled with elastomer. Such high degree of local pore filling may be obtained by applying elastomer solution in multiple steps with intermediate drying. The extent of pore filling can be determined with several techniques, for example it can be derived from optical or SEM micrographs, or by measuring the difference in pore volume of the modified film versus the base film. This may also be derived from mass increase of the film at an isolated area.

The isolated areas will typically form a minor part of the microporous hybrid film; the major part remaining unmodified and having substantially the same porosity as the original base film. For example, in case a single spot of about 2 mm diameter is made on a film of 10 by 10 cm, the elastomer-modified isolated area represents less than 0.04 area % (or correspondingly a segment representing less than 0.04 vol %) of the film, that is less than 0.04 area % relative to the total surface area of (one side of) the film. Considering the high porosity and low thickness of the polyolefin film, it is assumed that modifying the film with elastomer at a certain location results in a relative volume of the porous film being modified with elastomer, which film volume corresponds to the relative surface area of an isolated area. A modified surface area can be easily identified and measured, by analyzing the surface of the hybrid film. The isolated areas constitute at most 40 area % of the surface of the hybrid film, or at most 40 vol % of the volume of the porous hybrid film wherein pores are at least partly filled with elastomer. In embodiments, the isolated areas form at most 35, 30, 25, 20, 15, 10, 5 or 2.5 area % or vol %. In other embodiments, the isolated areas constitute at least 0.05 area % of the hybrid film; preferably at least 0.1, 0.2, 0.5 or 1 area %. Because relatively little elastomer is present in the hybrid film, properties of the base microporous polyolefin film that are advantageous for the intended use or application, like porosity, polarity, flexibility may be substantially retained, whereas tear resistance of the film is improved by only modifying with elastomer at locations identified as being critical.

The porosity of the porous hybrid film comprising elastomer locally within its pores is generally lower than that of the base polyolefin film, depending of course on the area % of isolated areas and extent of filling of pores in such area with elastomer. In embodiments, the porous hybrid film has an average porosity of 30-95 vol %. In other embodiments, the hybrid film has porosity of at least 40, 50, 60, 70 or 80 vol %, In further embodiments, the hybrid film has porosity of at most 92, 90 or 85 vol %.

The one or more isolated areas of the hybrid elastomer/polyolefin film are or have been selected as being those locations where tearing is likely to initiate or occur in an unmodified polyolefin film when the film is under load during an intended use of the hybrid film, for example as a component of a medical device. Within present disclosure these locations where tearing is likely to occur during intended use of the film are also called critical locations. These critical locations can be locations on or in the film where there are, or could likely be formed during use cracks, cuts, holes, or other irregularities or defects that may initiate or ease propagation of a tear; or be puncture holes or other locations where stress will be relatively high or concentrated under load during use of the hybrid film. The skilled person will be able to identify such critical locations during development of the film as a component of a device and its intended use, for example based on literature review, by computer aided designing and modelling, or by failure analysis on existing devices and/or performing tests on prototypes.

In the microporous hybrid elastomer/polyolefin film, pores at one or more isolated areas of the film are at least partly filled with an elastomer. An elastomer is a polymeric material showing a relatively low Young's modulus, high elongation and elastic recovery after elongation or deformation, compared with other materials like polyolefins such as polyethylenes and polypropylenes generally having a yield point and showing permanent elongation or deformation. The elastomer component of present hybrid film may be a thermosetting or thermoplastic material. The elastomer is preferably soluble in a suitable solvent, the advantage being that a solution of the elastomer can be used to locally impregnate the porous polyolefin film to at least partly fill pores with elastomer.

In embodiments, the elastomer is a thermoplastic elastomer. A thermoplastic elastomer (TPE) can be repeatedly molten by heating and solidified by cooling; and derives its elasticity from reversible physical cross-linking instead of from chemical cross-links as in thermoset rubbers. Such TPE can generally be dissolved in a good solvent. Many TPE materials are based on block (also called segmented)

copolymers, which are polymers comprising blocks (also called segments) of polymers (including oligomers) that are chemically distinct, and which typically show different thermal and mechanical properties, and different solubilities; such different blocks typically resulting in microphase separation. Often the blocks in a block copolymer comprising two (or more) types of blocks are referred to as being 'hard' and 'soft' polymer blocks. The hard block in a block copolymer typically comprises a rigid or high modulus polymer, with a melting temperature (Tm) or a glass transition temperature (Tg) higher than the use temperature, of e.g. about 35° C. in case of biomedical applications. The soft block in the block copolymer often comprises a flexible, amorphous polymer with a Tg lower than 25° C., preferably lower than 0° C. Thermal parameters like Tm and Tg are generally determined on dry samples; using well-known techniques like DSC or DMA. In such phase-separated block copolymers, the hard segments function as physical crosslinks for the flexible soft segments, resulting in materials having properties ranging from fairly stiff to flexible and elastic, depending on the ratio of hard to soft blocks.

In embodiments, the elastomer in the porous hybrid elastomer/polyolefin film is a TPE comprising hard and soft blocks, wherein the hard block comprises a polymer chosen from the group consisting of polyesters, polyamides, polystyrenes, polyacrylates, polyurethanes and polyolefins; and the soft block comprises a polymer chosen from the group consisting of polyethers, polyesters, polyacrylates, polyolefins and polysiloxanes (or silicones) or combinations thereof. Such polymers for the blocks are understood herein to include oligomers, homopolymers and copolymers, and polyesters are considered to include polycarbonates. Examples of such TPE block copolymers are copolyester esters, copolyether esters, and copolycarbonate esters, wherein the hard blocks typically are based on semi-aromatic polyesters like polybutylene terephthalate; copolyester amides and copolyether amides; ethylene-propylene block copolymers; styrene-ethylene-butadiene block copolymers (SEBS); styrene-isobutylene block copolymers (SIBS); and polyurethanes comprising hard blocks based on diisocyanates and chain extenders, and polyester, polyether and/or polysiloxane soft blocks.

In further embodiments, the elastomer is a thermoplastic polyurethane (TPU), more specifically a polyurethane block copolymer. The term thermoplastic polyurethanes denotes a family of polymers basically including at least three principle components; that are a diisocyanate, a diol chain extender, a polyol or macroglycol, and optionally a monofunctional compound as chain stopper forming endgroups. Polyurethanes have a backbone that includes urethane groups and optionally also some urea groups in the repeating units of the polymer backbone, resulting from reaction of a diisocyanate with a diol and optionally a diamine as chain extender.

In embodiments, the polyurethane comprises (the reaction product of) aromatic, aliphatic or cycloaliphatic diisocyanate compounds. Suitable diisocyanates, have an average of 1.9-2.1 isocyanate groups per molecule. In an embodiment, the diisocyanate comprises 4,4'-diphenylmethane diisocyanate (MDI), 2,4-toluene diisocyanate, 2,6-toluene diisocyanate (TDI), 1,4-phenylene diisocyanate, hexamethylene diisocyanate (HDI), tetramethylene-1,4-diisocyanate, cyclohexane-1,4-diisocyanate, dicyclohexylmethane-4,4'-diisocyanate (HMDI), isophorone diisocyanate (IPDI), or a mixture thereof. In an embodiment, the diisocyanate comprises hexamethylene diisocyanate, dicyclohexylmethane 4,4'-diisocyanate, isophorone diisocyanate, or a mixture thereof. In an embodiment, the diisocyanate consists of hexamethylene diisocyanate, dicyclohexylmethane 4,4'-diisocyanate, isophorone diisocyanate, or a mixture thereof. In an embodiment, the diisocyanate comprises 4,4'-diphenylmethane diisocyanate, 2,4-toluene diisocyanate, 2,6-toluene diisocyanate, or 1,4-phenylene diisocyanate. In an embodiment, the diisocyanate consists of 4,4'-diphenylmethane diisocyanate, 2,4-toluene diisocyanate, 2,6-toluene diisocyanate, 1,4-phenylene diisocyanate, or a mixture thereof. In an embodiment, the molar mass of the diisocyanate is from 100 to 500 g/mol. In an embodiment, the molar mass of the diisocyanate is from 150 to 260 g/mol.

Chain extenders are typically low molar mass aliphatic compounds, having two hydroxyl or amine groups. Bifunctional chain extenders result in linear, thermoplastic polymers, whereas multifunctional chain extenders lead to crosslinked products (as do multifunctional isocyanates). In an embodiment, the bifunctional chain extender has a molar mass of at least 60 g/mol, at least 70 g/mol, at least 80 g/mol, at least 90 g/mol, or at least 100 g/mol. In an embodiment, the chain extender has a molar mass of at most 500 g/mol, at most 400 g/mol, at most 300 g/mol, at most 200 g/mol, or at most 150 g/mol. In an embodiment, the chain extender comprises ethylene glycol, diethylene glycol, propylene glycol, dipropylene glycol, 1,3-propanediol, 1,4-butanediol, 1,5-pentanediol, 1,6-hexanediol, or 1,8-octanediol; and optionally such corresponding diamines. In embodiments, the polyurethane elastomer comprises only diol chain extenders and shows thermoplastic behavior.

In other embodiments, the polyurethane elastomer comprises hard blocks having both urethane and urea linkages. The advantage thereof is enhanced interaction between the hard blocks, allowing a higher content of soft blocks resulting in block copolymers showing enhanced flexibility and elasticity, and excellent flex life or fatigue resistance. Depending on the ratio diol/diamine, the polyurethane elastomer may show such strong interaction that at a melt processing temperature thermal degradation may be such that solution processing is to be preferred for optimal performance. Commercially available examples of such polyurethane elastomers comprising both urethane and urea linkages include Biospan® products (available from e.g. DSM Biomedical BV, Sittard-Geleen NL).

In further embodiments, the polyurethane elastomer comprises soft blocks derived from at least one aliphatic polymer diol or polyol, which is chosen from the group consisting of polyethers, polyesters, polyacrylates, polyolefins and polysiloxanes (also called silicones); which polymers are bifunctional with hydroxyl (or amine) terminal groups. Such polymer diols for the soft blocks are understood herein to include oligomers, homopolymers and copolymers, and polyesters are considered to include polycarbonates. Generally known polyurethane block copolymers and methods to prepare these copolymers are described in a.o. U.S. Pat. Nos. 4,739,013, 4,810,749, 5,133,742, 5,229,431 and 7,671,162.

In embodiments of the present invention the elastomer is a TPU, which comprises as soft block an aliphatic polyester diol, an aliphatic polyether diol, a poly(isobutylene) diol and/or a polysiloxane diol. As for chain extenders, also amine-functional soft blocks can be used, resulting in additional urea linkages. Biocompatibility and biostability of various polyurethane block copolymers in the human body has been proven.

Mechanical and other properties of a polyurethane block copolymer can be tailored by varying chemical compositions and/or molar mass of the blocks. The hard blocks of a block copolymer or TPE for use in the invention, including polyurethane TPU, may have a molar mass of about 160 to 10,000 Da, and more preferably about 200 to 2,000 Da. The molar mass of the soft segments may be typically about 200 to 100,000 Da, and preferably about 400 to 9000 Da. The ratio of soft to hard blocks can be chosen to result in certain stiffness or hardness of the polymer. Typically, durometer hardness of the TPE, especially of polyurethane elastomer, as measured with the Shore test using A or D scales, may be from 40 ShA, or at least 50 or 60 ShA and up to 80 or 75 ShD or up to 90, 85, 80, 75 ShA; generally representing a flexural modulus range of about 5 to 2500 MPa or a tensile modulus of about 5 to 2500 or 5 to 500 MPa (measured on dry-as-molded samples).

In further embodiments of present invention, the polyurethane TPU comprises an aliphatic polyether or an aliphatic polyester as soft block, more specifically an aliphatic polycarbonate. Suitable polyethers include poly(propylene oxide)diols, poly(tetramethylene oxide)diols, and their copolymers. Suitable aliphatic polyesters are generally made from at least one aliphatic dicarboxylic acid and at least one aliphatic diol, which components are preferably chosen such that an essentially amorphous oligomer or polymer is formed having a Tg below 10, 0, or −10° C. Aliphatic polycarbonate diols are based on similar aliphatic diols as used for polyester diols, and can be synthesized via different routes as known in the art. Suitable example include poly(hexamethylene carbonate)diol. In an embodiment, the polyurethane contains a combination of a polyether and an aliphatic polycarbonate in the soft segments, like blocks based on poly(tetramethylene oxide)diol and poly(hexamethylene carbonate)diol, or on a poly(polytetrahydrofuran carbonate)diol. The hard blocks in such polyurethanes are typically based on an aromatic diisocyanate like toluene diisocyanate (TDI) or methylenediphenyl diisocyanate (MDI), and a low molar mass aliphatic diol like 1,4-butanediol. Polycarbonate urethanes may be suitably used for biomedical applications, in view of their flexibility, strength, biostability, biocompatibility and wear resistance. A polyurethane containing combination of polyether or polycarbonate and polysiloxane as soft blocks shows a unique combination of properties and may also be used as elastomer. Commercially available examples of such polymers include Bionate® and Carbosil® TPU products (available from DSM Biomedical BV, Sittard-Geleen N L).

The polyurethane elastomer may comprise one or more endgroups, like an apolar endgroup. An endgroup is a generally a non-reactive moiety present at a terminal end of a molecule. In an embodiment, the polyurethane elastomer is linear and comprises an endgroup at each terminus of the backbone; that is an average of about 2 endgroups. In an embodiment, the endgroup is an apolar endgroup. In an embodiment, the apolar endgroup is linear. In another embodiment, the endgroup is branched. An endgroup may have been formed by reaction of a terminal isocyanate group during or after forming the polymer backbone with a co-reactive group on a monofunctional compound or chain stopper. For instance, a formulation for forming a polyurethane may comprise a diisocyanate, a polymeric aliphatic diol, a bifunctional chain extender, and a monofunctional compound; like 1-octanol or octylamine to form a $C_8$ alkyl endgroup.

In an embodiment, the apolar endgroup comprises a $C_2$-$C_{20}$ alkyl, a $C_2$-$C_{16}$ fluoroalkyl, a $C_2$-$C_{16}$ fluoroalkyl ether, a poly(alkylene oxide) or a polysiloxane, including copolymers thereof. In an embodiment, the poly(alkylene oxide) is poly(propylene oxide), poly(tetramethylene oxide) or a copolymer thereof. In an embodiment, the apolar endgroup is a polysiloxane, like a poly(dimethyl siloxane). In an embodiment, the endgroup comprises $C_2$-$C_{20}$ alkyl, $C_2$-$C_{16}$ fluoroalkyl, $C_2$-$C_{16}$ fluoroalkyl ether, or an apolar poly(alkylene oxide). In embodiments, the endgroup comprises a $C_5$-$C_{20}$ alkyl, $C_5$-$C_{16}$ fluoroalkyl or $C_5$-$C_{16}$ fluoroalkyl ether. Said endgroups may be formed with monofunctional alcohols, including carbinols, or amines of the foregoing. Such polyurethane elastomers having apolar endgroups are found to positively affect surface properties of the polyurethanes and interaction with other materials, including with other polymers like polyolefins and with bodily tissue and fluid like blood.

In an embodiment, the apolar endgroup comprises $C_2$-$C_{16}$ fluoroalkyl or $C_2$-$C_{16}$ fluoroalkyl ether. Such endgroups may be formed with monofunctional alcohols or amines comprising $C_5$-$C_{16}$ fluoroalkyl or $C_5$-$C_{16}$ fluoroalkyl ether. In an embodiment, the endgroup is formed from 1H,1H-Perfluoro-3,6-dioxaheptan-1-ol, 1H, 1H-Nonafluoro-1-pentanol, 1H,1H-Perfluoro-1-hexyl alcohol, 1H,1H-Perfluoro-3,6,9-trioxadecan-1-ol, 1H,1H-Perfluoro-1-heptyl alcohol, 1H,1H-Perfluoro-3,6-dioxadecan-1-ol, 1H,1H-Perfluoro-1-octyl alcohol, 1H,1H-Perfluoro-1-nonyl alcohol, 1H,1H-Perfluoro-3,6,9-trioxatridecan-1-ol, 1H,1H-Perfluoro-1-decyl alcohol, 1H,1H-Perfluoro-1-undecyl alcohol, 1H,1H-Perfluoro-1-lauryl alcohol, 1H,1H-Perfluoro-1-myristyl alcohol, or 1H,1H-Perfluoro-1-palmityl alcohol.

In an embodiment, the apolar endgroup is monomeric and has a molar mass of 200 g/mol or more, 300 g/mol or more, or 500 g/mol or more; and of 1,000 g/mol or less or 800 g/mol or less. In an embodiment, the endgroup is polymeric (or oligomeric) and has a molar mass of 10,000 g/mol or less, 8,000 g/mol or less, 6,000 g/mol or less, or 4,000 g/mol or less. In an embodiment, the endgroup is polymeric and has a molar mass of 500 g/mol or more, 1,000 g/mol or more, or 2,000 g/mol or more.

In an embodiment, the apolar endgroup is present in an amount of at least 0.1 mass %, at least 0.2 mass %, at least 0.3 mass %, or at least 0.5 mass %, based on the total mass of the polyurethane. In an embodiment, the apolar endgroup is present in an amount of at most 3 mass %, at most 2 mass % or at most 1 mass %, based on the total mass of the polyurethane. In an embodiment, the apolar endgroup is present in an amount of at least 0.1 mass %, at least 0.2 mass %, at least 0.3 mass %, or at least 0.5 mass %; and in an amount of at most 3 mass %, at most 2 mass % or at most 1 mass %, based on the total mass of the polyurethane.

The hard blocks in the TPU are typically based on an aromatic diisocyanate like toluene diisocyanate (TDI) or methylenediphenyl diisocyanate (MDI), and a low molar mass aliphatic diol like 1,4-butanediol. Polyether and polycarbonate polyurethanes may be suitably used for biomedical applications, in view of their flexibility, strength, biostability, biocompatibility and wear resistance. A TPU containing a combination of a polyether and a polysiloxane or a polycarbonate and a polysiloxane, for example as the soft blocks, show a unique combination of properties and may advantageously be used as the polyurethane in the coating. In embodiments, such TPU comprising a polysiloxane soft segment further comprises oligomeric polysiloxane endgroups. Commercially available examples of such polymers include Carbosil® TSPCU products (available from DSM Biomedical BV, Sittard-Geleen N L).

In embodiments, the elastomer used may be a blend of two or more polymers and may optionally comprise one or more customary additives that are allowed for the targeted use of the hybrid film made. Examples of additives are anti-oxidants, processing aids, lubricants, surfactants, antistatic agents, colorants, and fillers. The additives may be present in the typically effective amounts as known in the art, such as 0.01-5 mass % based on the amount of the polymer, preferably 0.01-1 mass %. In another embodiment, the elastomer substantially consists of polymer, and contains substantially no additives.

It is true that in U.S. Pat. No. 6,652,966 and related publications by Teoh et al., such as Composites Science and Technology 61 (2001) 2371, hybrid films are described based on a UHMWPE microporous film and polyether urethanes. In the method described in U.S. Pat. No. 6,652, 966, however, all interconnecting pores of the microporous film are impregnated to completely fill the pores with TPU resulting in an interpenetrated network of the immiscible polymers; and the resulting translucent film is subsequently heat compacted, that is at elevated temperature of preferable about 125° C. and under pressure, to form a transparent film. U.S. Pat. No. 6,652,966 reports on optical and tensile properties of films with completely filled pores, but does not disclose or suggest to only locally impregnate a porous UHMWPE film with TPU; and is silent regarding potential effects of local modification on properties, such as on tear resistance.

In WO2009/063067 a microporous membrane is described that is made by impregnating a microporous UHMWPE film with a solution of a polyamide to internally coat the pores of the film, aiming to increase hydrophilicity of the UHMWPE film and its water permeability. The document does not disclose a microporous UHMWPE film that is only locally impregnated with another polymer and is silent on mechanical properties like tear resistance.

In other aspects, the invention provides a method to increase tear resistance of a porous polyolefin film comprising steps of
a. Providing a porous polyolefin film;
b. Identifying one or more locations on the film, at which locations tearing is likely to occur during intended use of the film;
c. Applying at the identified locations of the film an amount of a solution of an elastomer in solvent; and
d. Substantially removing the solvent;
to result in a hybrid elastomer/polyolefin film having one or more isolated areas that form 0.02-40 area % of the surface of the film and at which areas pores in the film are at least partly filled with the elastomer.

In embodiments of this method of increasing tear resistance of a porous polyolefin film, a porous polyolefin film is provided as is described herein above for the microporous hybrid elastomer/polyolefin film, including all variations, preferred and optional features and alternatives; such as for a microporous UHMWPE film.

The method comprises a step b. of identifying locations or areas on the film, which are critical in the sense that during (intended) use of the film tearing is likely to initiate or occur at these locations under load. The skilled person will realize that such critical locations can be locations on or in the film where there are, or could likely be or be formed cracks, cuts, holes, or other irregularities or defects that may initiate or ease propagation of a tear under load. Other examples of critical locations can be puncture holes or other spots where stress will be relatively high or concentrated under load during use of the film.

In embodiments of the method, the skilled person may identify such critical locations on the film during development of the intended use of the film as for example a component of a medical device; for example by performing a literature review; by using computer aided designing and modelling including modelling distribution of stresses under different loads; or by doing some experiments on existing devices (like a medical device such as a catheter, stent-graft, or occlusion device) and/or on prototypes comprising the film as a component, including failure analysis after tearing or other damage occurring in the film.

In the next step c. of the present method, an amount of a solution of an elastomer in solvent is applied at the identified critical locations of the film and allowed to penetrate and impregnate the microporous film, such that a hybrid film results wherein at one or more isolated areas pores in the film are at least partly filled with the elastomer. The amount of solution to be applied at a certain location on the film, will be dependent on for example the area or volume to be treated, the concentration of elastomer in the solution, and the amount of elastomer that is at least (and at most, as limited by e.g. pore volume at the isolated area) to be deposited in the pores. Considering the generally low thickness of the film and a relatively small location or isolated area to be treated, the amount may be relatively small, such as one or more small droplets. Suitable ways to locally apply such amounts of solution may include using a micro-pipette or a syringe, by spraying, or by using an ink jet applicator. A mask or template may be used to apply the solution at the identified locations and/or in the desired pattern. As also indicated above, dip coating can be applied to impregnate one or more edge zones of a piece of film. In case of micro-pipetting, a pipette tip with a wide opening relative to the droplet volume is preferred for more even and reproducible application to the identified location. The desired amount of solution may be applied in one step, but also in multiple steps applying smaller amounts, for example with certain time between steps to allow the solution to penetrate the pores and the solvent to evaporate at one isolated (substantially round) spot, or by applying multiple droplets slightly overlapping or adjacent each other to form a stripe (an elongated area).

In step c. of applying an amount of a solution of an elastomer in solvent at the identified critical locations of the film, a solution of elastomer is used. Suitable elastomers for use in this step, wherein elastomer will be deposited in pores at the identified locations, are the elastomers as described herein above for the porous hybrid elastomer/polyolefin film, including all variations, preferred and optional features and alternatives; such as the preferred thermoplastic polyurethanes.

A suitable solvent for the solution of an elastomer that is applied in said applying step c. is a solvent wherein the elastomer can be substantially, or preferably homogeneously dissolved; but in which solvent the polyolefin is not dissolved, at least not while performing the present method. The person skilled in the art will be able to select a suitable solvent for a given elastomer and polyolefin combination based on his general knowledge, optionally supported by some literature; for example on solubility parameters of solvents and polymers, like the "Polymer Handbook" by Brandrup and Immergut, Eds. The skilled person is also aware of effects of polymer molar mass on solubility. For a so-called good solvent for a polymer including an elastomer, interactions between polymer chain and solvent molecules are energetically favorable, and difference between solubility parameters of polymer and solvent is small. In present case of finding a solvent for the elastomer which is a non-solvent for the polyolefin, the skilled person will realize that most of the elastomers, especially the (hard blocks of) thermoplastic elastomers, as described herein above will have a somewhat polar character, whereas polyolefins are typically apolar. In such case it is likely that a solvent that can dissolve the elastomer, for example assisted by stirring or sonication, and optionally by applying some heating, will not dissolve the polyolefin when the solution of elastomer is applied to the polyolefin film.

In exemplary embodiments of the method, especially wherein the elastomer is a polyurethane block copolymer, the solvent may be tetrahydrofuran (THF), methyl-tetrahydrofuran (m-THF), dimethylformamide (DMF), dimethylacetamide (DMAc), dimethylsulfoxide (DMSO), dioxane, dioxolane, mixtures thereof, or mixtures thereof with other less good solvents provided such mixtures can dissolve the elastomer or polyurethane. In view of removing the solvent from the film after the step of applying the solution, a solvent having such volatility that solvent can be substantially removed by evaporation, optionally by heating to a temperature at least 10° C. below the melting point of the polyolefin, is preferred. In this respect, THF appears to be very suitable in combination with a TPU.

The concentration of elastomer in the solution applied in step c. is not critical and generally the concentration will be in the range 0.1-10 mass % of elastomer in solvent. It was observed in experiments, however, that impregnation of the pores with the solution, and thus filling of pores with elastomer, proceeds easier and more reproducible if the solution is of relatively low viscosity. On the other hand, the higher the elastomer concentration the less solution needs to be used for effective impregnation or pore filling. In embodiments, the solution of elastomer therefore has a Brookfield viscosity of about 1-5000 mPa·s, or preferably a viscosity of at least 2, 5, 10 or 15 and at most 3000, 2000, 1000, 500, 400, 300, 200, 100, 50 or 25 mPa·s.

In the further step d. of the method, the solvent is substantially removed from the film. A simple and preferred way is to evaporate the solvent (or solvent mixture). This may be performed at ambient conditions, but also by applying a reduced pressure and/or an elevated temperature to enhance efficiency. If an increased temperature is used, care should be taken to prevent deterioration of properties of the hybrid film, for example caused by partial melting of the polyolefin material. Preferably, the temperature applied remains well, for example at least 10° C., below the melting temperature of the polyolefin. Optionally, or alternatively, a washing step is applied to substantially remove the solvent. Washing can be done with a liquid comprising or consisting of a wash solvent that is a non-solvent for the elastomer and the polyolefin, yet the wash solvent is miscible with the solvent for the elastomer. Such washing step can be performed at ambient temperature, but also at elevated temperature with similar constraints as indicated above.

The method to increase tear resistance of a microporous polyolefin film may optionally comprise a further step of compressing the film as obtained below the melting temperature of the polyolefin. Such compression step may be performed with different objectives. Compressing the hybrid film may for example reduce unevenness in the film, more evenly distribute the applied elastomer, or reduce thickness of the hybrid film. A compression step may be performed using known equipment, like a platen press or calendar rolls; and may be done at elevated temperature, with similar constraints as indicated above for drying in step d. In embodiments, like for a UHMWPE-based film, compressing is done at a temperature of about 20-145° C. while applying a force of up to about 50-2000 N/m², depending on desired amount of compression and/or thickness of the resulting film.

The method to increase tear resistance of a (micro)porous polyolefin film results in a modified porous polyolefin film (or porous hybrid elastomer/polyolefin film) having one or more isolated areas forming 0.02-40 area % of the surface of the film, at which areas pores in the film are at least partly filled with the elastomer as described herein above including all variations, preferred and optional features and alternatives; such as preferred microporous TPU/UHMWPE films.

Further aspects of the invention concern a method of making a modified porous polyolefin film or a porous hybrid elastomer/polyolefin film, comprising steps of
   a. Providing a porous polyolefin film;
   b. Identifying one or more locations on the film, at which locations tearing is likely to occur during intended use of the film;
   c. Applying at the identified locations of the film an amount of a solution of an elastomer in solvent; and
   d. Substantially removing the solvent;
to result in a hybrid elastomer/polyolefin film having one or more isolated areas that form 0.02-40 area % of the surface of the film and at which areas pores in the film are at least partly filled with the elastomer. The various ways and preferred ways and embodiments of operating this method and optional steps are fully analogous to what is described herein above for the modified or hybrid porous polyolefin film, and for the method of increasing tear resistance of a porous polyolefin film.

In still further aspects, the invention concerns the use of these porous hybrid films as a component of a medical implant or device, especially for such use wherein the porous hybrid film is in contact with body tissue or fluids, such as in vascular applications like a vascular graft, an occlusion device, a stent cover or a catheter balloon.

Other embodiments include a method of making a medical device or implant wherein said porous hybrid film is used as a component, and to medical device or implant, for example vascular devices like a vascular graft, an occlusion device, a stent cover or a catheter balloon, which device or implants comprise said (micro)porous hybrid films.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, and each separate value is incorporated into the specification as if it were individually recited herein. The use of any and all examples, or exemplary language (e.g., "such as" or "like") provided herein, is intended merely to better illustrate the invention and does not pose a limitation on the scope of the invention unless otherwise claimed. No language in the specification should be construed as indicating any non-claimed element as essential to the practice of the invention.

Preferred embodiments of the invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate. Accordingly, this invention includes all modifications and equivalents of the subject matter recited in the claims appended hereto as permitted by applicable law.

While certain optional features are described as embodiments of the invention, the description is meant to encompass and specifically disclose all combinations of these embodiments unless specifically indicated otherwise or physically impossible.

The various embodiments and ways of performing aspects of the invention as described above, are now further summarized by a series of exemplary embodiments.

1. A porous hybrid elastomer/polyolefin film, which comprises or is a porous polyolefin film wherein at one or more isolated areas forming 0.02-40 area % of the surface of the film, pores in the polyolefin film are at least partly filled with an elastomer.
2. A method to increase tear resistance of a porous polyolefin film comprising steps of
   a. Providing a porous polyolefin film;
   b. Identifying one or more locations on the film, at which locations tearing is likely to occur during intended use of the film;
   c. Applying at the identified locations of the film an amount of a solution of an elastomer in solvent; and
   d. Substantially removing the solvent;
   to result in a hybrid elastomer/polyolefin film having one or more isolated areas that form 0.02-40 area % of the surface of the film and at which areas pores in the film are at least partly filled with the elastomer.
3. A method of making a modified porous polyolefin film or a porous hybrid elastomer/polyolefin film, comprising steps of
   a. Providing a porous polyolefin film;
   b. Identifying one or more locations on the film, at which locations tearing is likely to occur during intended use of the film;
   c. Applying at the identified locations of the film an amount of a solution of an elastomer in solvent; and
   d. Substantially removing the solvent;
   to result in a hybrid film having one or more isolated areas that form 0.02-40 area % of the surface of the film and at which areas pores in the film are at least partly filled with the elastomer.
4. The hybrid film according to embodiment 1 or the methods according to embodiment 2 or 3, wherein the porous polyolefin film has been made from one or more polyolefins selected from homopolymers and copolymers containing one or more olefins as monomer units, including e.g. bipolymers, terpolymers, etc.
5. The hybrid film according to embodiment 1 or the methods according to embodiment 2 or 3, wherein the polyolefin is selected from polypropylenes, polyethylenes, and their copolymers or blends; like medium density polyethylene, linear or high density polyethylene, copolymers of ethylene and one or more alpha-olefins such as butene-1, hexene-1, and octene-1, linear low density polyethylene, very low density polyethylene, ultra-low density polyethylene, ethylene/propylene copolymers, propylene homopolymer, propylene/ethylene copolymers, polyisoprene, polybutylene, polybutene, poly-3-methylbutene-1, poly-4-methylpentene-1, and ionomers.
6. The hybrid film according to any one of embodiments 1 and 4-5, or the methods according to any one of embodiments 2-5, wherein the polyolefin is a polyethylene or polypropylene homopolymer, preferably the polyolefin is a linear polyethylene, like a high molecular weight polyethylene (HMWPE) or an ultra-high molecular weight polyethylene (UHMWPE).
7. The hybrid film according to any one of embodiments 1 and 4-6, or the methods according to any one of embodiments 2-6, wherein the polyolefin is a UHMWPE having an intrinsic viscosity (IV) of between 4 and 40 dL/g, preferably the IV is at least 5, 6, 7 or 8 dL/g and at most 30, 25, 20, 18, 16 or even at most 14 dL/g.
8. The hybrid film according to any one of embodiments 1 and 4-7, or the methods according to any one of embodiments 2-7, wherein the UHMWPE is a linear polyethylene, which optionally contains up to 5 mol % of one or more other alkenes that are copolymerisable with ethylene, e.g. $C_3$-$C_{12}$ or $C_3$-$C_8$ alkenes; like propene, 1-butene, 1-pentene, 4-methylpentene, 1-hexene and/or 1-octene.
9. The hybrid film according to any one of embodiments 1 and 4-8, or the methods according to any one of embodiments 2-8, wherein the UHMWPE is a blend comprising up to 25 mass % of another polyolefin.
10. The hybrid film according to any one of embodiments 1 and 4-9, or the methods according to any one of embodiments 2-9, wherein the porous polyolefin film has a porosity of 30-95 vol %, preferably of at least 40, 50, 60, 70 or 80 vol % and of at most 92, 90 or 88 vol %; and a pore size of 0.05-10 μm, preferably of at least 0.1 or 0.5 μm and at most 8 or 5 μm, as determined using a capillary flow porometer.
11. The hybrid film according to any one of embodiments 1 and 4-10, or the methods according to any one of embodiments 2-10, wherein the hybrid film has a thickness of 0.5-50 μm, preferably of at most 1, 2 or 3 μm and at most 40, 30, 20, 15 or 10 μm.
12. The hybrid film according to any one of embodiments 1 and 4-11, or the methods according to any one of embodiments 2-11, wherein an isolated area is a substantially circular spot with a diameter of at most about 5 mm, a non-circular spot with an average width of at most about 5 mm, or an elongated stripe with a width of at most 5 mm; preferably the isolated areas have a diameter or width of at most 4, 3, 2 or 1.0 mm and of at least 0.1, 0.2, 0.3, 0.4 or 0.5 mm.
13. The hybrid film according to any one of embodiments 1 and 4-12, or the methods according to any one of embodiments 2-12, wherein the pores at an isolated area are filled with elastomer for at least 20, 30, 40, 50, 60, 70, 80, or 90 vol %, or the pores are substantially filled with elastomer.
14. The methods according to any one of embodiments 2-12, wherein the elastomer solution is applied in multiple steps with intermediate drying.
15. The hybrid film according to any one of embodiments 1 and 4-13, or the methods according to any one of embodiments 2-14, wherein the isolated areas form at most 35, 30, 25, 20, 15, 10, 5 or 2.5 area %, and at least 0.05, 0.1, 0.2, 0.5 or 1 area % of the hybrid film.
16. The hybrid film according to any one of embodiments 1 and 4-15, or the methods according to any one of embodiments 2-15, wherein the hybrid film has a porosity of 30-95 vol %, preferably of at least 50, 60, 70 or 80 vol % and of at most 90 or 85 vol %.
17. The hybrid film according to any one of embodiments 1 and 4-16, or the methods according to any one of embodiments 2-16, wherein the one or more isolated areas are critical locations where tearing is likely to occur when an unmodified polyolefin film is under load during an intended use of the hybrid film, critical locations are for example cracks, cuts, holes, or other irregularities or defects that may initiate or ease propagation of a tear; or locations where stress will be relatively high or concentrated under load during use of the hybrid film.

18. The hybrid film according to any one of embodiments 1 and 4-17, or the methods according to any one of embodiments 2-17, wherein the elastomer is soluble in a solvent.

19. The hybrid film according to any one of embodiments 1 and 4-18, or the methods according to any one of embodiments 2-18, wherein the elastomer is a thermoplastic elastomer (TPE), preferably based on a block copolymer comprising hard and soft polymer blocks.

20. The hybrid film according to any one of embodiments 1 and 4-19, or the methods according to any one of embodiments 2-19, wherein the elastomer is a TPE comprising hard blocks comprising a rigid or high modulus polymer with a melting temperature (Tm) or a glass transition temperature (Tg) higher than 35° C., preferably the hard blocks comprise a polymer chosen from the group consisting of polyesters, polyamides, polystyrenes, polyacrylates, polyurethanes and polyolefins.

21. The hybrid film according to any one of embodiments 1 and 4-20, or the methods according to any one of embodiments 2-20, wherein the elastomer is a TPE comprising soft block comprising a flexible, amorphous polymer with a Tg lower than 25° C., preferably lower than 0° C., preferably the soft blocks comprise a polymer chosen from the group consisting of polyethers, polyesters, polyacrylates, polyolefins and polysiloxanes (or silicones) or combinations thereof.

22. The hybrid film according to any one of embodiments 1 and 4-21, or the methods according to any one of embodiments 2-21, wherein the elastomer is a block copolymer selected from copolyester esters, copolyether esters, and copolycarbonate esters, wherein hard blocks preferably are based on semi-aromatic polyesters like polybutylene terephthalate; copolyester amides and copolyether amides; ethylene-propylene block copolymers; styrene-ethylene-butadiene block copolymers (SEBS); styrene-isobutylene block copolymers (SIBS); and polyurethanes comprising hard blocks based on diisocyanates and chain extenders, and soft blocks based on an aliphatic polyester, polyether and/or polysiloxane.

23. The hybrid film according to any one of embodiments 1 and 4-22, or the methods according to any one of embodiments 2-22, wherein the elastomer is a thermoplastic polyurethane (TPU), derived from a diisocyanate, a diol chain extender, a polymer diol soft block, and optionally a diamine as chain extender and/or a monofunctional compound as endgroup.

24. The hybrid film or the methods according to embodiment 23, wherein the TPU comprises aromatic, aliphatic or cycloaliphatic diisocyanate compounds, preferably at least one diisocyanate selected from 4,4'-diphenylmethane diisocyanate (MDI), 2,4-toluene diisocyanate, 2,6-toluene diisocyanate (TDI), 1,4-phenylene diisocyanate, hexamethylene diisocyanate (HDI), tetramethylene-1,4-diisocyanate, cyclohexane-1,4-diisocyanate, dicyclohexylmethane-4,4'-diisocyanate (HMDI), isophorone diisocyanate (IPDI).

25. The hybrid film or the methods according to embodiment 23 or 24, wherein the diisocyanate consists of hexamethylene diisocyanate, dicyclohexylmethane 4,4'-diisocyanate, isophorone diisocyanate, or a mixture thereof.

26. The hybrid film or the methods according to embodiment 23 or 24, wherein the diisocyanate consists of 4,4'-diphenylmethane diisocyanate, 2,4-toluene diisocyanate, 2,6-toluene diisocyanate, 1,4-phenylene diisocyanate, or a mixture thereof.

27. The hybrid film or the methods according to any one of embodiments 23-26, wherein the TPU comprises a bifunctional chain extender having hydroxyl or amine groups, preferably the chain extender has a molar mass of at least 60 g/mol, at least 70 g/mol, at least 80 g/mol, at least 90 g/mol, or at least 100 g/mol, and of at most 500 g/mol, at most from 400 g/mol, at most 300 g/mol, at most 200 g/mol, or at most 150 g/mol.

28. The hybrid film or the methods according to any one of embodiments 23-27, wherein the TPU comprises as chain extender at least one compound selected from ethylene glycol, diethylene glycol, propylene glycol, dipropylene glycol, 1,3-propanediol, 1,4-butanediol, 1,5-pentanediol, 1,6-hexanediol, or 1,8-octanediol; and/or such corresponding diamines.

29. The hybrid film or the methods according to any one of embodiments 23-28, wherein the TPU comprises hard blocks having both urethane and urea linkages.

30. The hybrid film or the methods according to any one of embodiments 23-29, wherein the TPU comprises soft blocks derived from at least one aliphatic polymer diol chosen from the group consisting of polyethers, polyesters, polyacrylates, polyolefins and polysiloxanes.

31. The hybrid film or the methods according to any one of embodiments 23-30, wherein the TPU comprises as soft block at least one selected from an aliphatic polyester diol, an aliphatic polyether diol, a poly(isobutylene) diol and a polysiloxane diol.

32. The hybrid film or the methods according to any one of embodiments 23-31, wherein the TPU comprises hard blocks having a molar mass of about 160 to 10,000 Da, preferably about 200 to 2,000 Da.

33. The hybrid film or the methods according to any one of embodiments 23-32, wherein the TPU comprises soft blocks having a molar mass of about 200 to 100,000 Da, preferably about 400 to 9000 Da.

34. The hybrid film or the methods according to any one of embodiments 23-33, wherein the TPU comprises an aliphatic polyether as soft block, like a poly(propylene oxide)diol, poly(tetramethylene oxide)diol or their copolymers.

35. The hybrid film or the methods according to any one of embodiments 23-34, wherein the TPU comprises an aliphatic polyester as soft block, preferably an aliphatic polycarbonate like a poly(hexamethylene carbonate) diol.

36. The hybrid film or the methods according to any one of embodiments 23-35, wherein the TPU contains a combination of an aliphatic polyether and an aliphatic polycarbonate, for example derived from a poly(tetramethylene oxide)diol and a poly(hexamethylene carbonate)diol, as soft blocks.

37. The hybrid film or the methods according to any one of embodiments 23-35, wherein the TPU contains a combination of an aliphatic polyether or polycarbonate and a polysiloxane as soft blocks 38. The hybrid film according to any one of embodiments 1 and 4-37, or the methods according to any one of embodiments 2-37, wherein the elastomer is a TPE or a TPU with a durometer hardness, as measured with the Shore test using A or D scales on dry-as-molded samples, of at least 40, 50 or 60 ShA and at most 80 or 75 ShD or at most 90, 85, 80 or 75 ShA.
39. The hybrid film or the methods according to any one of embodiments 23-38, wherein the TPU comprises one or more apolar endgroups, preferably the TPU comprises an average of about 2 apolar endgroups.
40. The hybrid film or the methods according to embodiment 39, wherein the apolar endgroup comprises a $C_2$-$C_{20}$ alkyl, a $C_2$-$C_{16}$ fluoroalkyl, a $C_2$-$C_{16}$ fluoroalkyl ether, a poly(alkylene oxide) or a polysiloxane, including copolymers thereof.
41. The hybrid film or the methods according to embodiment 39 or 40, wherein the apolar endgroup is poly(propylene oxide), poly(tetramethylene oxide) or a copolymer thereof.
42. The hybrid film or the methods according to embodiment 39 or 40, wherein the apolar endgroup is a polysiloxane, like a poly(dimethyl siloxane) oligomer.
43. The hybrid film or the methods according to embodiment 39 or 40, wherein the endgroup comprises a $C_2$-$C_{20}$ alkyl, $C_2$-$C_{16}$ fluoroalkyl or $C_2$-$C_{16}$ fluoroalkyl ether, preferably a $C_5$-$C_{20}$ alkyl, $C_5$-$C_{16}$ fluoroalkyl or $C_5$-$C_{16}$ fluoroalkyl ether.
44. The hybrid film or the methods according to embodiment 43, wherein the endgroup is formed from 1H,1H-Perfluoro-3,6-dioxaheptan-1-ol, 1H, 1H-Nonafluoro-1-pentanol, 1H,1H-Perfluoro-1-hexyl alcohol, 1H,1H-Perfluoro-3,6,9-trioxadecan-1-ol, 1H,1H-Perfluoro-1-heptyl alcohol, 1H,1H-Perfluoro-3,6-dioxadecan-1-ol, 1H,1H-Perfluoro-1-octyl alcohol, 1H,1H-Perfluoro-1-nonyl alcohol, 1H,1H-Perfluoro-3,6,9-trioxatridecan-1-ol, 1H,1H-Perfluoro-1-decyl alcohol, 1H,1H-Perfluoro-1-undecyl alcohol, 1H,1H-Perfluoro-1-lauryl alcohol, 1H,1H-Perfluoro-1-myristyl alcohol, or 1H,1H-Perfluoro-1-palmityl alcohol.
45. The hybrid film or the methods according to any one of embodiments 39-44, wherein the apolar endgroup is monomeric and has a molar mass of at least 200, 300 or 500 g/mol; and of at most 1,000 or 800 g/mol.
46. The hybrid film or the methods according to any one of embodiments 39-44, wherein the endgroup is polymeric and has a molar mass of at most 10,000, 8,000, 6,000 or 4,000 g/mol; and of at least 500, 1,000 or 2,000 g/mol.
47. The hybrid film or the methods according to any one of embodiments 39-46, wherein the apolar endgroup is present in an amount of at least 0.1, 0.2, 0.3 or 0.5 mass % based on the total mass of the polyurethane; and in an amount of at most 3, 2 or 1 mass % based on the total mass of the polyurethane.
48. The hybrid film or the methods according to any one of embodiments 23-47, wherein the TPU is based on an aromatic diisocyanate like toluene diisocyanate (TDI) or methylenediphenyl diisocyanate (MDI), a low molar mass aliphatic diol like 1,4-butanediol, and an aliphatic polycarbonate diol, a combination of an aliphatic polycarbonate diol and a polysiloxane diol, or a combination of an aliphatic polyether diol and a polysiloxane,
49. The hybrid film according to any one of embodiments 1 and 4-48, or the methods according to any one of embodiments 2-48, wherein the elastomer is a blend of two or more polymers, and optionally comprises one or more customary additives like anti-oxidants, processing aids, lubricants, surfactants, antistatic agents, colorants, and fillers
50. The hybrid film according to any one of embodiments 1 and 4-48, or the methods according to any one of embodiments 2-48, wherein the elastomer substantially consists of polymer and contains substantially no additives.
51. The methods according to any one of embodiments 2-50, wherein step b. comprises identifying critical locations where cracks, cuts, holes, or other irregularities or defects that may initiate or ease propagation of a tear under load are present or could likely be formed, including puncture holes or other spots where stress will be relatively high or concentrated under load.
52. The methods according to any one of embodiments 2-51, wherein step c. comprises applying an amount of a solution of an elastomer in solvent at the identified critical locations of the film and allowing the solution to penetrate and impregnate the microporous film, such that a hybrid film is formed wherein at one or more isolated areas pores in the film are at least partly filled with the elastomer.
53. The methods according to any one of embodiments 2-52, wherein elastomer solution is applied using a micro-pipette or a syringe, by spraying, by an ink jet applicator, or by dip-coating; optionally using a mask or template for a desired pattern.
54. The methods according to any one of embodiments 2-53, wherein solution of elastomer is applied in one step, or in multiple steps with certain time between steps to allow the solution to penetrate the pores and the solvent to evaporate.
55. The methods according to any one of embodiments 2-54, wherein the solvent can substantially dissolve the elastomer, but does not dissolve the polyolefin while performing the method.
56. The methods according to any one of embodiments 2-55, wherein the solvent is selected from tetrahydrofuran (THF), methyl-tetrahydrofuran, dimethylformamide, dimethylacetamide, dimethylsulfoxide, dioxane, dioxolane, mixtures thereof, and mixtures thereof with other less good solvents.
57. The methods according to any one of embodiments 2-56, wherein the elastomer is a TPU and the solvent is THF.
58. The methods according to any one of embodiments 2-57, wherein the solution comprises 0.1-10 mass % of elastomer in solvent.
59. The methods according to any one of embodiments 2-58, wherein the elastomer solution has a Brookfield viscosity of about 1-5000 mPa·s, preferably of at least 2, 5, 10 or 15 and of at most 3000, 2000, 1000, 500, 400, 300, 200, 100, 50 or 25 mPa·s.
60. The methods according to any one of embodiments 2-59, wherein in step e. the solvent is substantially removed by evaporation, optionally by heating to a temperature at least 10° C. below the melting point of the polyolefin.
61. The methods according to any one of embodiments 2-60, wherein step e. optionally or alternatively comprises a washing step to substantially remove the solvent, preferably with a liquid comprising or consisting of a wash solvent that is a non-solvent for the elastomer and the polyolefin, but miscible with the solvent for the elastomer.

62. The methods according to any one of embodiments 2-61, further comprising a step of compressing the film as obtained below the melting temperature of the polyolefin.
63. The method according to embodiment 62, wherein the polyolefin film is based on UHMWPE and compressing is done at a temperature of about 20-145° C. while applying a force of up to about 50-2000 N/m$^2$
64. Use of the porous hybrid elastomer/polyolefin film as described in or obtained with any one of embodiments 1-63 as a component of a medical implant or device, preferably such use wherein the hybrid film is in contact with body tissue or fluids; for example in vascular applications like a vascular graft, an occlusion device, a stent cover or a catheter balloon.
65. A method of making a medical device or implant, comprising using a porous hybrid film as described in or obtained with any one of embodiments 1-63 as a component of the medical device or implant, for example of a vascular device like a vascular graft, an occlusion device, a stent cover or a catheter balloon, which device or implant.
66. A medical device or implant, for example a vascular device like a vascular graft, an occlusion device, a stent cover or a catheter balloon, which device or implant comprises a porous hybrid film as described in or obtained with any one of embodiments 1-63.

The experiments and samples below further elucidate embodiments of the invention, but of course, should not be construed as in any way limiting the scope of the claims.

Examples and Comparative Experiments

Methods

Film Thickness

Thickness of a film is measured using a calibrated mechanical thickness scanner; type Millitron 1234-IC, following ISO4593. The thickness scanner has a lower plane surface and an upper plane-measuring surface with a diameter of 11.3 mm (100 mm$^2$) parallel to the lower surface. The total load on the measuring foot, type Mahr P2004MA, is 0.75 N.

Pore Size

Average pore size values of a porous membrane can be derived from Gurley air permeability values, measured with the Gurley test method according to ISO 5636-5, expressed in s/50 ml and converted into µm by 1.77 dividing by the Gurley number. Average pore size value of a film can also be determined with a capillary flow porometer; based on the displacement of a wetting liquid from the pores by applying a gas at increasing pressure. Such method assumes that the pores are of cylindrical shape and go straight through the membrane.

Viscosity of Elastomer Solution

Solution viscosity at 25° C. is determined with a Brookfield DV-E viscometer with UL-adaptor and ULA-49EAY spindle, which is calibrated using silicone-based viscosity standards (Benelux Scientific).

Tear Resistance

Tear resistance was measured with trouser tear test at ambient conditions, performed in three-fold on rectangular film samples of about 200*50 mm, wherein a longitudinal slit of 100 mm was made, starting at the center of the width to form a trouser; as based on ISO 13937-2. Each leg of the trouser was clamped in opposite clamps of a Zwick Z010 tensile tester, and loaded until failure at 100 mm/min.

Experiments CE 1 and Ex 2

The porous polyolefin film used as base film in these (and subsequent) experiments is a medical grade, bi-axially stretched, microporous UHMWPE membrane, having thickness of about 15 µm, porosity of 83 vol %, and average flow pore size of about 1 µm (Dyneema Purity® membrane, available from DSM Biomedical BV, Sittard-Geleen N L).

A 10 mass % solution of a thermoplastic silicone-polycarbonate urethane of Shore hardness 80 ShA (Carbosil® TSPCU, available from DSM Biomedical BV, Sittard-Geleen N L) in THF (Lichrosolve) was prepared, by first drying the polyurethane pellets overnight at 70° C. and then stirring THF and pellets overnight at room temperature. This solution was found to have a Brookfield viscosity of 478 mPa·s.

One droplet of the polyurethane solution was applied approximately in the center of 5 pieces of UHMWPE film using a micropipette, and samples were dried in air. The dried spot had a diameter of about 1 mm and represents less than 1 area % of the piece of film tested.

Subsequently, the pieces of membrane were punctured with a needle resulting in a hole of about 0.2 mm diameter in the middle of the applied spot. Similarly, 5 non-treated pieces of UHMWPE film were punctured with the needle. These punctured samples were then stress loaded by hand in the machine direction of the film to have an initial impression of change in tearing behavior. It was found that the native UHMWPE film in all cases teared across the punctured hole (Comparative experiment 1), whereas the film provided with the polyurethane impregnated spot (Example 2) teared at random and not across the punctured hole. These indicative tests at least strongly suggest that locally impregnating the microporous UHMWPE film with a thermoplastic polyurethane at a location that was found to be critical in tearing upon load significantly changes, and likely improves, tearing behavior and/or tear resistance of the microporous film.

Figure 2A:
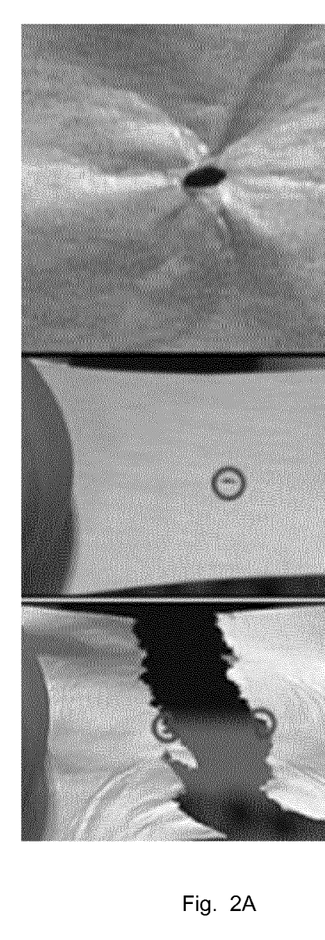
FIGS. 2A-2B show some photos illustrating the tear behavior of punctured porous UHMWPE films, with and without local modification with a polyurethane elastomer.
Figure 2B:
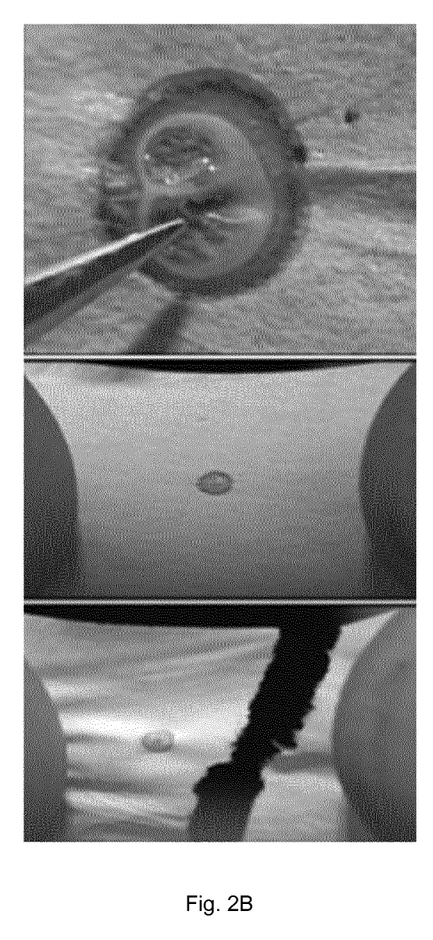
Figure 3:
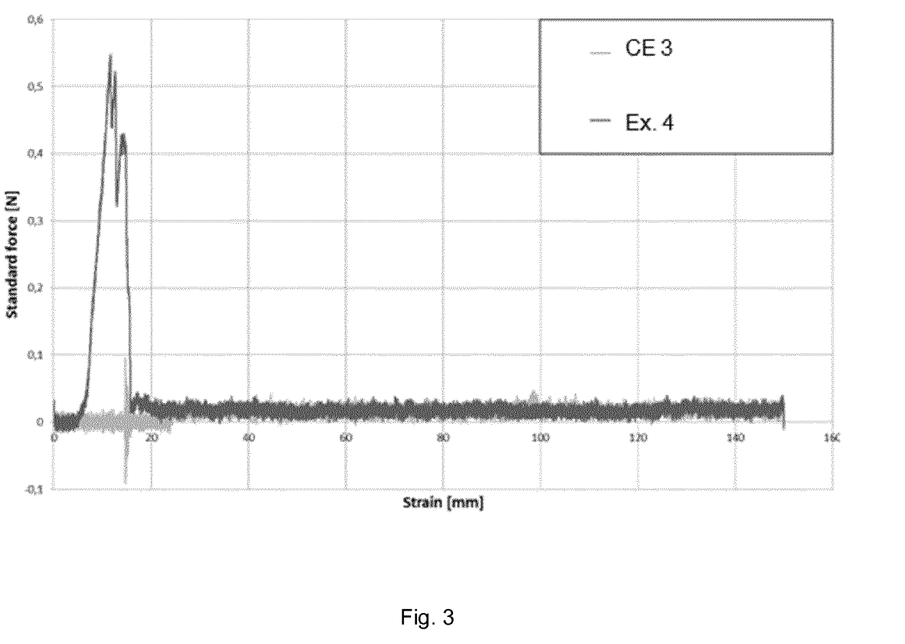
FIG. 3 shows examples of measured force versus elongation in a trouser tear test on elastomer-modified and unmodified microporous UHMWPE films.

In FIGS. 2A and 2B photos of punctured and teared films are represented, wherein 2A shows the non-modified film (CE 1) and 2B the locally impregnated UHMWPE film (Ex 2).

Experiments CE 3 and Ex 4

In these experiments a 3 mass % solution in THF of a thermoplastic polycarbonate urethane with apolar endgroups and of Shore hardness 80 ShA (Bionate® II PCU, available from DSM Biomedical BV, Sittard-Geleen N L) was made analogous as indicated above. The solution made had a Brookfield viscosity of about 22 mPa·s.

Based on some orienting experiments, it was found that a more reproducible impregnated spot, that is size and form of the spot resulting from applying a drop of polyurethane solution on microporous UHMWPE film, resulted from applying a droplet with a micropipette having a relatively wide tip opening, rather than using a narrow tip or hypodermic needle-like tip. Using such procedure, three droplets of about 0.5 µl of the polyurethane solution were placed at the end of the slit made in the UHMWPE film sample for the trouser tear test and dried at room temperature in air. The dried spot had a diameter of about 2 mm.

The morphology of films at the polyurethane spot was assessed by SEM, on a cross-section of the film. The images clearly showed that the pores between fibrillar material were almost completely filled with (the polyurethane) material.

Results of trouser tear testing for native UHMWPE films (Comparative experiment 3) showed a low and almost constant force for tearing the sample over its entire length (about 100 mm). The force needed to tear the film samples locally impregnated with polyurethane (Example 4) was substantially higher than for the native films; especially in the first 25 mm of tearing, with peaks in the measured force of up to about 20 times the average value for the unmodified films. These results demonstrate effectiveness in increasing tear resistance by applying polyurethane in the pores of the film at a relatively small and isolated spot, which spot is at a critical location for tearing of the porous film sample under an applied load.

The invention claimed is:

1. A porous hybrid film, comprising a porous polyolefin film wherein at one or more isolated areas forming 0.02-40 area % of the surface of the film, pores in a volume segment of the film across its thickness are at least partly filled with an elastomer at an amount of at least 20 vol % of the volume of the pores, and wherein outside said isolated areas the polyolefin film is substantially devoid of the elastomer, wherein the polyolefin is ultra-high molar mass polyethylene (UHMWPE) and wherein the elastomer is a thermoplastic polyurethane (TPU).

2. The porous hybrid film according to claim 1, wherein the polyolefin film is a microporous ultra-high molar mass polyethylene (UHMWPE) film having a thickness of 0.5-50 µm.

3. The porous hybrid film according claim 1, wherein an isolated area is a substantially circular spot on the film with a diameter of at most 5 mm or an elongated stripe with a width of at most 5 mm.

4. The porous hybrid film according to claim 1, wherein the pores at an isolated area are at least 50 vol % filled with elastomer.

5. The porous hybrid film according to claim 1, wherein the isolated areas constitute 0.2-25 area % of the surface of the film.

6. The porous hybrid film according to claim 1, wherein the elastomer is a thermoplastic polyurethane comprising an aliphatic polyether and/or an aliphatic polycarbonate as soft block.

7. The porous hybrid film according to claim 6, wherein the thermoplastic polyurethane comprises an apolar endgroup.

8. The porous hybrid film according to claim 7, wherein the apolar endgroup comprises a C2-C20 alkyl, a C2-C16 fluoroalkyl, a C2-C16 fluoroalkyl ether, a poly(alkylene oxide) or a polysiloxane.

9. The porous hybrid film according to claim 1, wherein the hybrid film has a porosity of 30-95 vol %.

10. The porous hybrid film according to claim 1, wherein the pores at an isolated area are at least 80 vol % filled with elastomer.

11. A medical device or implant comprising a porous hybrid film according to claim 1.

12. The medical device or implant according to claim 11, wherein the device or implant is a vascular graft, a vascular occlusion device, a stent cover, or a catheter balloon.

13. The medical device or implant according to claim 11, wherein the polyolefin film has a multitude of pores with maximum pore size of 50 µm as determined with a capillary flow porometer.

14. The medical device or implant according to claim 11, wherein the TPU contains a combination of an aliphatic polycarbonate and a polysiloxane as soft blocks.

15. A method to increase tear resistance of a porous polyolefin film comprising steps of:
 a. providing a porous polyolefin film;
 b. identifying one or more locations on the film, at which locations tearing is likely to occur during intended use of the film;
 c. applying at the identified locations of the film an amount of a solution of an elastomer in solvent; and
 d. substantially removing the solvent;
 to result in a porous hybrid film having one or more isolated areas forming 0.02-40 area % of the surface of the film, in which areas pores in a volume segment across the thickness of the film are at least partly filled with the elastomer, wherein outside said areas the original porosity of the polyolefin film is substantially unchanged and wherein the polyolefin is ultra-high molar mass polyethylene (UHMWPE) and the elastomer is a thermoplastic polyurethane (TPU).

16. The method according to claim 15, wherein the TPU comprises one or more apolar endgroups.

17. The method according to claim 16, wherein the apolar endgroup comprises a C2-C20 alkyl, a C2-C16 fluoroalkyl, a C2-C16 fluoroalkyl ether, a poly(alkylene oxide) or a polysiloxane.

18. The method according to claim 15, wherein the solution of elastomer has a Brookfield viscosity of 1-500 mPa·s.

19. The method according to claim 15, further comprising the step of compressing the film as obtained at a temperature below the melting temperature of the polyolefin.

20. The method according to claim 15, wherein the TPU comprises an aliphatic polyether and/or an aliphatic polycarbonate as soft block.

21. The method according to claim 15, wherein the isolated area is a substantially circular spot with a diameter of at most 5 mm or an elongated stripe with a width of at most 5 mm.

22. A medical device or implant comprising a porous hybrid film obtained by the method according to claim 15.

23. The medical device or implant according to claim 22, wherein the device or implant is a vascular graft, a vascular occlusion device, a stent cover, or a catheter balloon.

* * * * *